United States Patent
Jaouen et al.

(10) Patent No.: US 12,061,888 B2
(45) Date of Patent: Aug. 13, 2024

(54) METHOD FOR VERIFYING AN EXECUTION OF A SOFTWARE PROGRAM

(71) Applicant: STMicroelectronics (Grand Ouest) SAS, Le Mans (FR)

(72) Inventors: Michel Jaouen, Yvre l'Eveque (FR); Gilles Trottier, Fay (FR)

(73) Assignee: STMicroelectronics (Grand Ouest) SAS, Le Mans (FR)

( * ) Notice: Subject to any disclaimer, the term of this patent is extended or adjusted under 35 U.S.C. 154(b) by 223 days.

(21) Appl. No.: 17/882,292

(22) Filed: Aug. 5, 2022

(65) Prior Publication Data

US 2023/0040093 A1 Feb. 9, 2023

(30) Foreign Application Priority Data

Aug. 5, 2021 (FR) ...................................... 2108499

(51) Int. Cl.
*G06F 8/60* (2018.01)
*G06F 9/445* (2018.01)
*G06F 21/52* (2013.01)

(52) U.S. Cl.
CPC ................ *G06F 8/60* (2013.01); *G06F 9/445* (2013.01); *G06F 21/52* (2013.01)

(58) Field of Classification Search
None
See application file for complete search history.

(56) References Cited

U.S. PATENT DOCUMENTS

| 7,987,451 B1* | 7/2011 | Dalcher | G06F 21/52 717/126 |
| 2007/0285271 A1* | 12/2007 | Erlingsson | G06F 21/52 340/815.84 |
| 2024/0045946 A1* | 2/2024 | Plaquin | G06F 21/554 |

OTHER PUBLICATIONS

Lettner et al., "Assessment of computer fault tolerance—a fault-injection toolset and the rationale behind it," Elsevier, 1999, 13pg. (Year: 1999).*
Nashimoto et al., "Buffer overflow attack with multiple fault injection and a proven countermeasure," Springer, 2017, 12pg. (Year: 2017).*
Timmers et al., "Controlling PC on ARM using Fault Injection," IEEE, 2016, 11pg. (Year: 2016).*
Lucas Davi, M., et al., "HAFIX: Hardware-Assisted Flow Integrity Extension", Proceedings of the 34th ACM Sigmod Sigai Symposium on Principles of Database Systems, Jun. 7, 2015, 6 total pages.

(Continued)

*Primary Examiner* — Ryan D. Coyer
(74) *Attorney, Agent, or Firm* — Slater Matsil, LLP

(57) ABSTRACT

A method can be used for verifying an execution of a compiled software program stored in a program memory of a processor and executed by the processor. A write operation includes assigning a destination address in a register of the processor and writing a datum at a location pointed to by the destination address contained in the register. A verification operation includes reassigning the same destination address in the same register, reading the datum contained at the location pointed to by the destination address contained in the register after the reassignment, and comparing the read datum and the written datum.

20 Claims, 4 Drawing Sheets

(56) References Cited

OTHER PUBLICATIONS

Özdoganoglu, H., et al., "SmashGuard: A Hardware Solution to Prevent Security Attacks on the Function Return Address", Nov. 22, 2003, retrieved from https://engineering.purdue.edu/ResearchGroups/SmashGuard/SmashGuard_TR2_Nov03.pdf, 41 total pages.

Rouf, Mohammad Abdur, et al. "Low-Cost Control Flow Protection via Available Redundancies in the Microprocessor Pipeline", IEEE Transactions on Very Large Scale Integration (VLSI) Systems, vol. 23, No. 1, Jan. 2015, pp. 131-141.

\* cited by examiner

FIG.2

H_LVL_LANG

```
do {FLASH->CR |= FLASH_CR_SEC_PROT1;
} while ((FLASH->CR & FLASH_CR_SEC_PROT1) != FLASH_CR_SEC_PROT1);   ~110
FMB();
if ((FLASH->CR & FLASH_CR_SEC_PROT1) != FLASH_CR_SEC_PROT1);        ~120
```

FIG.3

| H_LVL_LANG | PC | OPC | MNEM | VARVAL |
|---|---|---|---|---|
| FLASH->CR \| = FLASH_CR_SEC_PROT1 | | | | |
| | 0x2000'1024 : | 0x480d | LDR.N | R0, [PC, #0x34] |
| | 0x2000'1026 : | 0x6801 | LDR | R1, [R0] |
| | 0x2000'1028 : | 0xf051 0x5180 | ORRS.W | R1, R1, #268435456 |
| | 0x2000'102c : | 0x6001 | STR | R1, [R0] |
| } while ((FLASH->CR & FLASH_CR_SEC_PROT1) != FLASH_CR_SEC_PROT1); | | | | |
| | 0x2000'102e : | 0x6801 | LDR | R1, [R0] |
| | 0x2000'1030 : | 0x00c9 | LSLS | R1, R1, #3 |
| | 0x2000'1032 : | 0xd5f7 | BPL.N | 0x2000'1024 |
| FMB(); | | | | |
| | 0x2000'1034 : | 0x480d | LDR.N | R0, [PC, #0x24] |
| if ((FLASH->CR & FLASH_CR_SEC_PROT1) != FLASH_CR_SEC_PROT1); | | | | |
| | 0x2000'1036 : | 0x6800 | LDR | R0, [R0] |
| | 0x2000'1038 : | 0x00c0 | LSLS | R0, R0, #3 |
| | 0x2000'1040 : | 0xd401 | BMI.N | 0x2000'103e |

110, 120

METHOD FOR VERIFYING AN EXECUTION OF A SOFTWARE PROGRAM

CROSS-REFERENCE TO RELATED APPLICATIONS

This application claims priority to French Application No. 2108499, filed on Aug. 5, 2021, which application is hereby incorporated herein by reference.

TECHNICAL FIELD

Embodiments relate a method for verifying an execution of a software program.

BACKGROUND

Fault injection techniques, used in reverse engineering, allow to cause unusual behavior in the operations of an electronic system, for example a microcontroller, by intentionally introducing errors ("fault injection") and with the aim of extracting secret information.

For example, following an injection of faults into the system, the registers of a processing unit (called a processor) may be modified.

The software operations executed by the processor are conventionally programmed so as to implement flow control to resist these modifications. However, the programming is done in a high-level language, typically a "programming language" such as C code, and the instructions in low-level language, or "machine language" such as assembler code, resulting from a compilation (or "assembly") may not behave as expected.

For example, after a writing to a peripheral, flow control typically performs a re-reading in the peripheral to verify that the value has been written. However, when the register containing the peripheral address is changed by fault injection, writing and reading can be performed at the same wrong address. Thus, the verification detects that the datum is written correctly to a certain address, without being able to detect that the address is incorrect. As a result, flow control is not effective for this error.

A conventional technique against this problem comprises implementing write in one function, and then implementing re-reading in another function.

However, on the one hand this technique makes programming more complex, and on the other hand, certain security recommendations require that the verification be carried out immediately after writing the datum, to ensure that the protection is really active, before to continue any other execution. In practice, this technique is not applicable.

Another conventional technique against this problem comprises the use of a combination of specific instructions in the high-level code, so as to generate a volatile variable in RAM memory (for "Random Access Memory" element well known to the person skilled in the art) to carry the address, and in order to force a reloading of the address, from the RAM memory location, into the register before performing the re-reading.

In other words, this alternate technique introduces specific high-level language encoding, going through indirection in RAM memory (an "indirection" means "an addressing", or "a use of a memory location") to use the address. Consequently, this other technique also complicates the programming of the verification by requiring the "volatile" nature of the variable containing the address, and uses additional and non-optimized resources (a volatile variable being a variable on which no compilation optimization is applied). And, this use of a volatile variable does not replace the step of verifying the generated assembly.

SUMMARY

Embodiments and implementations relate to verifying the execution of software programs, in particular in terms of verifying security against, for example, fault injections.

Embodiments can provide methods for verifying a write operation that are simple in terms of programming protection operations, efficient in terms of execution and consumption of resources, and reliable in terms of security.

Embodiments provide methods for verifying the execution of a software program that comprise at least one write operation to a destination address assigned in a register and a verify operation using a "mnemonic" instruction, that is to say an instruction requiring the compiler to use a particular instruction. In this regard, the compiler produces a reassignment of the same destination address in the same register, after writing and before re-reading, so as to erase any fault injected into the destination address in a simple, efficient and reliable manner.

A "mnemonic" is a term, symbol, or name used to define or specify a computer function. Mnemonics are used in computer science to provide a means for users to quickly access an instruction, function, service, or process, bypassing a more time-consuming method usually used to execute or perform it.

According to one aspect, provision is made in this regard of a method for verifying an execution of a compiled software program stored in a program memory of a processor and executed by the processor. The method comprises at least one write operation, which includes an assignment of a destination address in a register of the processor and a writing of a datum at the location pointed to by the destination address contained in the register. A compiled verify operation comprises a reassignment of the same destination address in the same register, a reading of the datum contained at the location pointed to by the destination address contained in the register after the reassignment, and a comparison between the read datum and the written datum.

In particular, the steps of the write operation and the steps of the verify operation are compiled instructions, that is to say machine language instructions, typically generated automatically by a compiler from a code in programming language.

Thus, in the method according to this aspect, the compiler is "forced" to perform the reassignment of the destination address in the register, and, consequently, a fault injection in the contents of the register after the first assignment of the destination address may impact the write operation, but will be "erased" for reading the verify operation. The verify operation is then able to identify and detect the malfunction.

According to one embodiment, the reassignment of the verify operation is performed for all the immediate assignments of data in registers, such as destination addresses of write operations, made during the execution of the at least one write operation, an immediate assignment being a writing in a register of a datum present at an address defined by a shift added to a value of an absolute address.

Indeed, the case of a fault injection on an address value which is reflected during the verification of the write, is particularly problematic when the fault injection affects the absolute address placed in the registers to perform immediate assignments. Indeed, during an immediate assignment, the address defined by a shift on an absolute address is typically stored temporarily in a register, in order to be able to access the datum present at this address.

This implementation thus allows generalized prevention on all immediate assignments implemented for the write operation(s).

According to one embodiment, the execution of the software program comprises a compilation of a programming language code into machine language instructions, and at least one machine language instruction dedicated to the implementation of the reassignment is required when compiling by a mnemonic in the programming language code.

In other words, in the programming language, the mnemonic requires, during compilation, the generation of one or more instruction(s) in machine language (for example instructions in assembler for reloading registers) dedicated to the implementation of the reassignment.

The compiler, in its compilation context, is thus forced to "forget" that a given register contains (theoretically) the same value as that necessary to perform the verification of the register.

A machine language instruction generated during compilation is usually designated by a "mnemonic", or an "opcode" (contraction of "operation code") associated therewith. The "mnemonic" is a symbolic representation that is easier to read and identify by a human than the numerical "opcode" of an instruction in the assembler-type machine language that results from compiling the code into a programming language. In the high-level programming language, a code intended to require the generation of the corresponding machine language "opcode" instructions during compilation is also called "mnemonic".

Thus, in this implementation, the compilation advantageously benefits from a mnemonic requiring the reassignment.

According to one embodiment, the at least one write operation and the verify operation are implemented in the execution of the same function of the software program.

According to one embodiment, the execution of the same function of the software program comprises a code compilation implementing an optimization of resources comprising a reuse of the content assigned in the register for separate instructions of the same function.

Indeed, the optimization of a function during compilation can generate, in a priori unexpected way during programming, the repercussion on the verified address of a fault injected into the written address. On the other hand, not using a separate function to perform the verification is advantageous in itself.

According to one implementation, the comparison of the verify operation comprises generating an error message if the read datum and the written datum are not identical.

According to another aspect, provision is also made of a computer program product comprising instructions which, when the program is executed by a computer, cause the latter to implement the method as defined above.

According to another aspect, provision is also made of a non-transitory computer readable medium comprising instructions which, when executed by a computer, cause the latter to implement the method as defined above.

According to another aspect, provision is also made of a device comprising a processor, a program memory configured to contain a compiled software program intended to be executed by the processor, the software program comprising instructions which, when executed by the processor, cause the latter to implement the method as defined above

BRIEF DESCRIPTION OF THE DRAWINGS

For a more complete understanding of the present invention, and the advantages thereof, reference is now made to the following descriptions taken in conjunction with the accompanying drawings, in which:

FIG. 2 illustrates an example of code in high-level language;

FIG. 3 illustrates the compilation in low-level language; and

DETAILED DESCRIPTION OF ILLUSTRATIVE EMBODIMENTS

Figure 1:
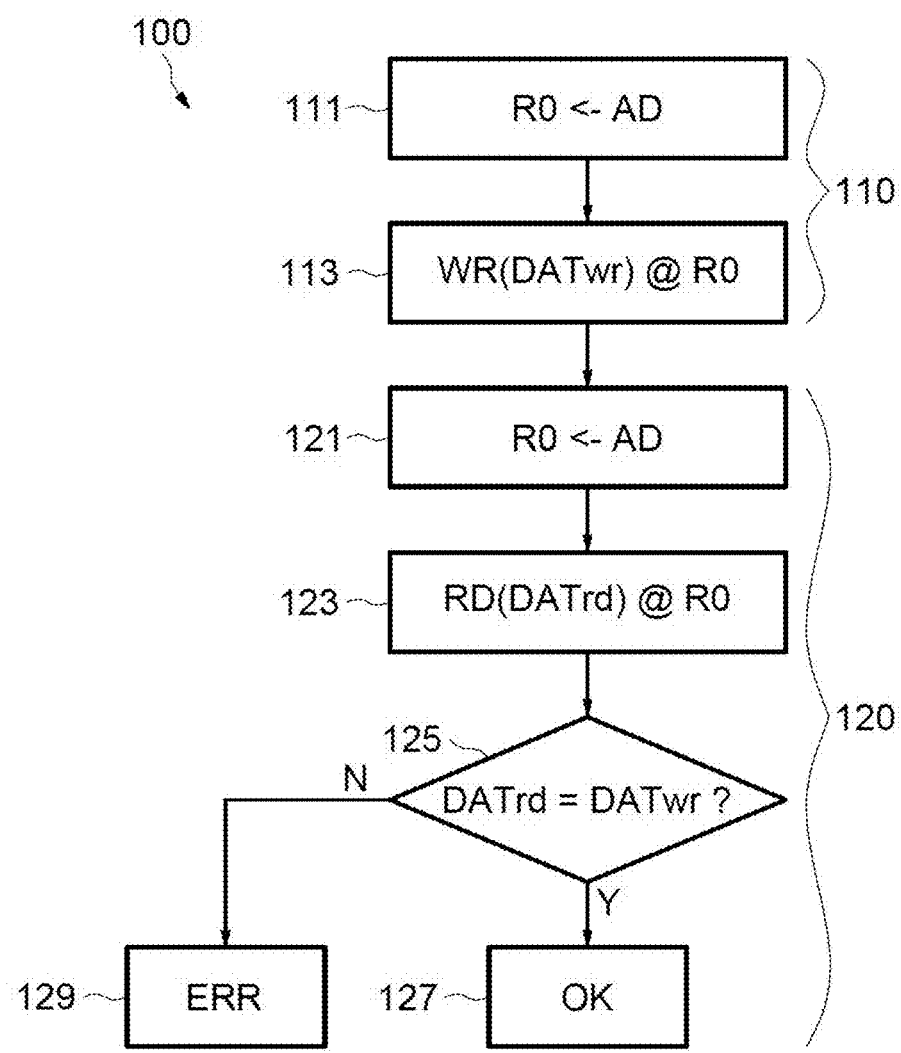
FIG. 1 illustrates a method for verifying an execution of a software program.
Figure 4:
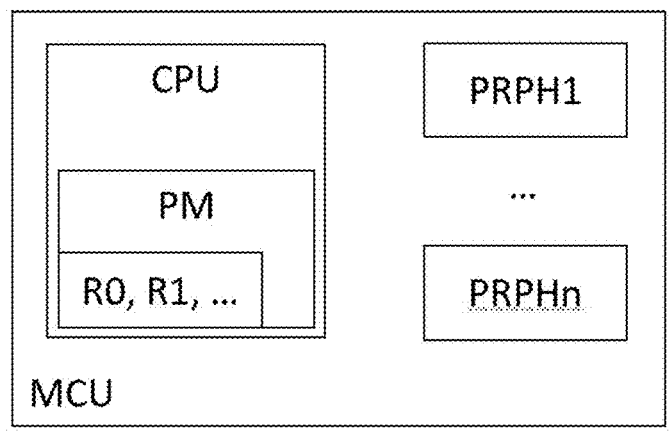
FIG. 4 illustrates an example of a device configured to implement methods of the invention.

FIG. 1 represents a method 100 for verifying an execution of a software program, stored in practice in a program memory MP (FIG. 4) of a processing unit, also called a processor, and executed by the processor CPU (FIG. 4). Steps 111-129 of the method 100 correspond to the actions of the device executing the program after compilation of a programming code, such as code C.

The method 100 can be embodied in practice by a computer program comprising instructions which, when the program is executed by a computer, cause the latter to implement the method 100.

The method 100 can also be embodied in practice by a non-transitory computer readable medium comprising instructions which, when executed by a computer, cause the latter to implement the method 100.

The execution of the program comprises one or more operations of writing no data DATwr in memory locations designated by addresses AD, called destination addresses. In this example, only one write operation no is performed. The memory location can belong to a peripheral, such as a non-volatile memory for storing data, or any other peripheral such as writing one or more control bit(s) in a status register.

The write operation no comprises an assignment in of the destination address AD in a register R0, that is to say a loading of the register R0 with the value of the destination address AD, then a writing 113, "WR( )" of the datum to be written "DATwr" at the pointed location "@" by the destination address contained in the register R0.

If a fault is injected FLT into the contents of the register R0 between assignment 111 and write 113, then the datum DATwr will be written at an erroneous location with the incorrect address.

Then, a verify operation 120, the purpose of which is to verify that the datum is correctly written to the memory location having the destination address, first comprises a reassignment 121 of the same destination address AD in the same register R0.

Consequently, the possible fault injected FLT in the contents of the register R0 is erased and the non-erroneous destination address AD is loaded in the register R0.

After reassignment 121, the verify operation performs a reading 123, "RD" of the datum "DATrd" contained at the location pointed to "@" by the destination address AD contained in the register R0.

Then, in step 125, the read datum "DATrd" is compared with the written datum "DATwr" of step 113.

If the comparison 125-Y identifies that the read datum "DATrd" is identical to the written datum "DATwr", then the verify operation 120 has not detected an abnormality, and the processor is in a normal state 127.

If the comparison 125-N identifies that the read datum "DATrd" is not identical to the written datum "DATwr", then the verify operation 120 has detected an abnormality, and an error message ERR is generated in step 129.

Indeed, if a fault injection FLT was made in the register R0 between the assignment step 111 and the writing step 113, then the datum DATwr was not written in the memory location, which on the contrary, contains the datum DATrd read in the reading step 123.

Moreover, implementing a second fault injection between the reassignment step 121 and the reading step 123 so as to produce the same erroneous address during the reading step 123 as during the writing step 113, is difficult enough to be implemented for the verification method 100 to provide satisfactory protection against fault injections.

FIG. 2 illustrates an example of code in high-level language H_LVL_LANG, also called programming language, in this example the code C, implementing the verification method 100 described in relation to FIG. 1.

The code lines encoding the implementation of the write operation are referenced 110, and the code lines encoding the implementation of the verify operation are referenced 120.

The code "FLASH→CR|=FLASH_CR_SEC_PROT1;" means "modify flash→cr by performing a logical OR operation with its current value and FLASH_CR_SEC_PROT1" and corresponds to the elementary write operation of the high-level language H_LVL_LANG.

The loop "do { } while ((FLASH→CR & FLASH_CR_SEC_PROT1)!=FLASH_CR_SEC_PROT1);" means "as long as the element FLASH→CR does not contain at least the value FLASH_CR_SEC_PROT1, do the action between the braces { }".

This corresponds to a mechanism typically employed to ensure that the action between the braces of "do { }", that is to say writing, can be done. Indeed, it is possible that the peripheral wherein the writing is carried out is much slower than the processing unit which executes the code, and the loop "while" allows to wait until the peripheral has carried out the writing.

The code line "FMB( );" corresponds to a mnemonic type call, requiring at least one assembler instruction to implement the reassignment step 121 previously described in relation to FIG. 1.

Finally, the code "if ((FLASH→CR & FLASH_CR_SEC_PROT1)!=FLASH_CR_SEC_PROT1)" means "if FLASH→CR does not have the value FLASH_CR_SEC_PROT1 then True, otherwise False", and corresponds to the comparison 125 of the method 100 of FIG. 1. Implicitly, "True" and "False" are the two states of the error message generated according to the comparison 125 (FIG. 1).

In this example of writing the code implementing the comparison 125 (FIG. 1), the error message is generated in the "True" state 129 (FIG. 1) if the read datum and the written datum are not identical, and in the "False" state 127 (FIG. 1) if the read datum and the written datum are identical.

For example, the mnemonic instruction "FMB( )" is intended to perform the reassignment 121 (FIG. 1) of all immediate assignments made in the compilation of the code.

In particular, the mnemonic instruction "FMB( )" can be provided to perform the reassignment 121 (FIG. 1) of all the immediate assignments of data in registers, such as the destination addresses of write operations, made during the compilation and execution of the at least one write operation no.

An immediate assignment is a writing in a register of a datum present at an address defined by a shift added to a value of an absolute address "[PC, #0x34]" (FIG. 3). The absolute address PC is usually the current address of the execution of the program, called the program counter.

Also in particular, the mnemonic instruction "FMB( )" is intended to force the reassignment 121 (FIG. 1) of the immediate assignments made in the compilation and execution of the same function of the software program.

In other words, the mnemonic instruction, called by the code "FMB( )", offers a memory fault barrier that is simple to use and efficient in its execution.

Thus, thanks to the call to the mnemonic instruction "FMB( )", a programmer may require and specify the behavior of the compiler according to the flow control that he wishes to implement, in the high-level code H_LVL_LANG such as code C.

Reference is now made to FIG. 3, which illustrates the compilation in low-level language L_LVL_LANG, also called machine language or assembler code, of the high-level code H_LVL_LANG of FIG. 2.

Compiled assembler code lines for implementing the write operation are referenced no, and compiled assembler code lines for implementing the verify operation are referenced 120.

The high-level code lines H_LVL_LANG in FIG. 2 are reproduced above the assembler code lines corresponding to their respective compilations.

The assembler code lines are identified by the program counter PC 0x2000'1024-0x2000'1040, the assembler instructions of each line are identified on the one hand by a numerical opcode OPC, and by a mnemonic name MNEM. In the following, each assembler code instruction will be designated by their mnemonic name MNEM, and/or by the corresponding value of the program counter PC. The last column VARVAL of each instruction line shows the data and variables, or more generally the operands, used in the execution of the respective instructions.

Thus, the write operation no begins at the line 0x2000'1024 with an assignment of a destination address in a register R0 with the instruction LDR.N controlling a loading of the datum contained at the address "PC, #0x34" in the register R0.

The address "PC, #0x34" is an immediate assignment of content located at an address obtained by a shift #0x34 added to a value of an absolute address PC. The absolute address is the current address of the program counter PC, that is to say 0x2000'1024 for this instruction LDR.N. The datum loaded into the register R0 is accordingly located at the line of the program counter PC 0x2000'1058 (not shown), which contains the destination address AD (FIG. 1) of the write operation.

The instruction LDR of the line 0x2000'1026 is a loading of the content [R0] pointed to by the value of the register R0, that is to say the content of the memory cell of the destination address AD (FIG. 1), in a second register R1.

The instruction ORRS.W of the line 0x2000'1028 is a writing of a mask #268435456 . . . expressing the data to be written "FLASH_CR_SEC_PROT1", on the value R1, in the second register R1.

The instruction STR of the line 0x2000'102C is a loading of the value of the second register R1, that is to say the data to be written "FLASH_CR_SEC_PROT1" in the content [R0] pointed to by the value of the register R0, that is to say in the memory cell of the destination address.

The instructions of lines 0x2000'102e to 0x2000'1032 carry out the optional loop "while", by reloading LDR the content [R0] pointed to by the value of R0 in the register R1, by comparing LSLS this content with the previous value of the register R1, #3 (LSLS meaning "level shift"), and the branching BPL.N to the line 0x2000'1024 of the start of the write operation no as long as the comparison does not detect an identity.

The instruction LDR.N of the line 0x2000'1034 is required in the assembler code L_LVL_LANG by the mnemonic code "FMB( )" of the high-level language H_LVL_LANG, and corresponds to the reassignment of the same destination address in the same register R0.

The destination address is contained in the line of the program counter PC 0x2000'1058 (not shown), thus the register R0 is again loaded LDR.N by an immediate assignment of the content located at the address 0x2000'1058 defined, for this instruction, by a shift #0x24 added to the current address 0x2000'1034 of the program counter PC.

Then, the instruction LDR of the line 0x2000'1036 performs the step (123 FIG. 1) of reading the datum [R0] contained at the location pointed to by the value of the register R0, that is to say the value of the memory cell of the destination address, after reassignment of the line 0x2000'1034.

And, the instruction LSLS of the line 0x2000'1038 performs the step of comparison (125 FIG. 1) between the read datum and the written datum, by comparing LSLS the content pointed to by the value of the register R0 after the reassignment, with the content pointed to by the previous value of the register R0.

It will be noted that the compilation L_LVL_LANG of the high-level code H_LVL_LANG can implement an optimization of the resources comprising a reuse of the content assigned in the various registers R0, R1 for instructions distinct from the same function.

However, upon encountering the mnemonic "FMB( )" when compiling the program, the compiler must perform data reassignment in all registers that contain data obtained by immediate assignment. The compiler in its compilation context should "forget" that a register R0, R1, contains the same value as that needed to perform the verification.

In this case, this means adding more than one assembler instruction (such as LDR.N of line 0x2000'1034), if there are multiple registers to be reassigned due to multiple immediate assignments. In other words, the mnemonic "FMB( )" forces the compiler to repeat several immediate assignments, which would generate an addition of several assembler instructions.

FIG. 4 illustrates an example of a device MCU, for example a microcontroller, configured to implement the method described in relation to FIG. 1.

The device comprises a processor CPU, that is to say a processing unit, a program memory PM is configured to contain a compiled software program L_LVL_LANG, for example as described previously in relation to FIG. 3, in order to be executed by the processor CPU.

Thus, the software program comprises instructions which, when executed by the processor CPU, cause the processor CPU to implement the method 100 (FIG. 1).

The program memory PM of the processor MPU contains in particular the memory locations of the registers R0, R1 described in relation to FIG. 3, as well as in particular the instruction lines 0x2000'1024 to 0x2000'1040 of the assembler code L_LVL_LANG.

The device MCU further includes peripherals PRPH1, . . . , PRPHn, such as for example a non-volatile memory, a communication interface on a data bus, or else sensitive processing units such as cryptographic processing.

The non-volatile memory PRPH1 can include regions having hierarchical access rights, for example a region called "secure" region, and a "non-secure" region.

The memory location having the destination address AD (FIG. 1) of the write operation of the software program may for example belong to the secure region of the non-volatile memory PRPH1.

Access rights to regions of the memory PRPH1 are managed by the processor CPU in particular, and can be corrupted by fault injection techniques FLT (FIG. 1), as described previously.

Thus, the implementation of the method 100 allows the device MCU to be resistant to fault injections, and therefore to protect the data belonging, or intended to belong, to the secure region of the non-volatile memory PRPH1.

On the other hand, the memory location having the destination address AD (FIG. 1), controlled by the write operation of the software program, may for example belong to a cryptographic processing unit PRPHn.

Again, fault injection techniques FLT (FIG. 1) in the processing of the processor CPU could gain unauthorized access to secret information, and sensitive processing operations of the cryptographic processing unit PRPHn.

And here again, the implementation of the method 100 allows the device MCU to be resistant to fault injections, and therefore to guard against unauthorized access to sensitive processing units PRPHn.

What is claimed is:

1. A method for verifying an execution of a compiled software program stored in a program memory of a processor and executed by the processor, the method comprising:
    performing a write operation that comprises assigning a destination address in a register of the processor and writing a datum at a location pointed to by the destination address contained in the register; and
    performing a verification operation that includes reassigning the same destination address in the same register, reading the datum contained at the location pointed to by the destination address contained in the register after the reassignment, and comparing the read datum and the written datum.

2. The method according to claim 1, wherein reassigning the verify operation comprises performing the reassignment for all immediate assignments of data in registers made during performance of the write operation.

3. The method according to claim 2, wherein each immediate assignment comprises writing a datum in a register at an address defined by a shift added to a value of an absolute address.

4. The method according to claim 1, wherein the execution of the software program comprises a compilation of a programming language code into machine language instructions and wherein a machine language instruction dedicated to implementing of the reassigning is required when compiling by a mnemonic in the programming language code.

5. The method according to claim 1, wherein the write operation and the verify operation are implemented in the execution of the same function of the software program.

6. The method according to claim 5, wherein the execution of the same function of the software program comprises a code compilation implementing an optimization of resources comprising a reuse of content assigned in the register for separate instructions of the same function.

7. The method according to claim 1, wherein the comparing the read datum and the written datum comprises generating an error message when the read datum and the written datum are not identical.

8. A non-transitory computer readable medium comprising instructions which, when executed by a computer, cause the computer to implement the method according to claim 1.

9. A device comprising:
   a processor;
   a program memory configured to contain a compiled software program intended to be executed by the processor, the software program comprising instructions which, when executed by the processor, cause the process to execute a write operation followed by a verification operation;
   wherein the write operation comprises assigning a destination address in a register of the processor and writing a datum at a location pointed to by the destination address contained in the register; and
   wherein the verification operation comprises reassigning the same destination address in the same register, reading the datum contained at the location pointed to by the destination address contained in the register after the reassignment, and comparing the read datum and the written datum.

10. The device according to claim 9, wherein reassigning the verify operation comprises performing the reassignment for all immediate assignments of data in registers made during performance of the write operation.

11. The device according to claim 10, wherein each immediate assignment comprises writing a datum in a register at an address defined by a shift added to a value of an absolute address.

12. The device according to claim 9, wherein the execution of the software program comprises a compilation of a programming language code into machine language instructions and wherein a machine language instruction dedicated to implementing of the reassigning is required when compiling by a mnemonic in the programming language code.

13. The device according to claim 9, wherein the write operation and the verify operation are implemented in the execution of the same function of the software program.

14. The device according to claim 13, wherein the execution of the same function of the software program comprises a code compilation implementing an optimization of resources comprising a reuse of content assigned in the register for separate instructions of the same function.

15. The device according to claim 9, wherein the comparing the read datum and the written datum comprises generating an error message when the read datum and the written datum are not identical.

16. A method of operating a computer device that includes a processor, the method comprising:
   executing, by the processor, a software program by compiling a programming language code into machine language instructions;
   performing a write operation that comprises assigning a destination address in a register of the processor and writing a datum at a location pointed to by the destination address contained in the register; and
   performing a verification operation that includes reassigning the same destination address in the same register, reading the datum contained at the location pointed to by the destination address contained in the register after the reassignment, and comparing the read datum and the written datum, wherein a machine language instruction dedicated to implementing the reassigning is required when compiling by a mnemonic in the programming language code.

17. The method according to claim 16, wherein reassigning the verify operation comprises performing the reassignment for all immediate assignments of data in registers made during performance of the write operation.

18. The method according to claim 17, wherein each immediate assignment comprises writing a datum in a register at an address defined by a shift added to a value of an absolute address.

19. The method according to claim 16, wherein the write operation and the verify operation are implemented in the execution of the same function of the software program.

20. The method according to claim 19, wherein the execution of the same function of the software program comprises a code compilation implementing an optimization of resources comprising a reuse of content assigned in the register for separate instructions of the same function.

* * * * *